United States Patent [19]

Mohr

[11] 3,865,768

[45] Feb. 11, 1975

[54] AQUEOUS FIBER GLASS SIZING COMPOSITION

[75] Inventor: John Gilbert Mohr, Maumee, Ohio

[73] Assignee: Johns-Manville Corporation, Greenwood Village, Colo.

[22] Filed: June 25, 1973

[21] Appl. No.: 373,329

[52] U.S. Cl. .................. 260/23 AR, 260/29.6 MN
[51] Int. Cl. ...................... C08f 45/50, C03c 25/02
[58] Field of Search ............... 260/29.6 MN, 23 AR

[56] References Cited
UNITED STATES PATENTS

| | | | |
|---|---|---|---|
| 3,062,677 | 11/1962 | Wong | 260/29.6 MM |
| 3,261,736 | 7/1966 | Eilerman | 260/29.6 MM |
| 3,644,141 | 2/1972 | Preston | 260/29.6 XA |

*Primary Examiner*—Lucille M. Phynes
*Attorney, Agent, or Firm*—Robert M. Krone; James W. McClain

[57] ABSTRACT

A glass sizing composition having a degree of lubricity appropriate to formation of roving and compatible with polyester mixes is described. This composition contains a specifically defined poly(vinyl acetate) latex film former, at least one alkyl amide reaction product of a $C_5$ to $C_{20}$ alkyl carboxylic acid and an ethylene amine, a nonionic surfactant derived from hydrogenated fatty acid containing oil, and deionized water.

10 Claims, No Drawings

AQUEOUS FIBER GLASS SIZING COMPOSITION

BACKGROUND OF THE INVENTION

This invention relates to fiber glass sizing compositions, and more particularly, to fiber glass sizing compositions useful for formation of roving bundles which are compatible with polyester resin mixes.

Fiber glass sizing compositions are generally well known and are widely used to coat glass fibers, to impart to the fibers such properties as abrasion resistance, anti-static character and improved weaving character. However, it is well known that the various compositions must be carefully and precisely formulated to achieve the properties desired, since relatively small differences in the types of materials present as components or their concentration in the size will very materially alter the physical and chemical properties of the size. This specificity of sizes is clearly indicated by the large number of sizing compositions presently in use, each of which has been tailored to a particular use.

In recent years composite reinforced plastic pipe has achieved a wide acceptance in the market place. Such pipes are composed of layers of material bonded together. A typical pipe will comprise a layer of a plastic bonded granular material, which is then surrounded by a reinforcing layer of resin bonded glass fiber. These layers may repeat and alternate and/or layers of additional materials may also be present. For this end use it is highly desirable that the glass fiber have sufficient lubricity to be easily formed into rovings and that the size on the glass fibers be compatible with the polyester resin utilized in the formation of the composite pipe.

It is therefore an object of this invention to formulate a glass fiber size composition, which will provide a degree of lubricity appropriate to the formation of rovings and which will also be compatible with polyester resin mixes.

BRIEF SUMMARY OF THE INVENTION

The glass fiber sizing composition of this invention has a degree of lubricity appropriate to formation of roving and is compatible with polyester mixes. This composition comprises 0.5 to 15.0 weight percent of a poly(vinyl acetate) latex film former having a solids content of about 50–60 percent, a particle size in the range of about 0.25 to 0.35 micron and a pH in the range of 4.5 to 5.0; 0.01 to 0.6 weight percent of a polyester compatible silane; 0.01 to 1.0 weight percent of at least one alkyl amide reaction product of a $C_5$ to $C_{20}$ alkyl carboxylic acid and an ethylene amine; 0.05 to 0.5 weight percent of a non-ionic surfactant derived from hydrogenated fatty acid containing oil; and the balance comprising deionized water.

DETAILED DESCRIPTION AND PREFERRED EMBODIMENTS

The fiber glass sizing composition of this invention is a composition having, in addition to the ordinary properties expected of a glass fiber size, the additional desired properties of a degree of lubricity appropriate to the formation of rovings and a compatibility with polyester resin mixes. By a degree of lubricity appropriate to the formation of rovings is meant that degree of lubricity which will permit the individual glass fibers to be readily collected into roving, but which will not be so great that the fibers, once collected, will have a tendency to slip apart. While no specific quantitative measure of the appropriate degree of lubricity can be given, those skilled in the art will readily recognize the particular property here described. For instance, those skilled in the art will be aware that certain materials, such as low molecular weight polyethylene glycols provide an inordinately high degree of lubricity, which imparts to the indivdual strands a tendency to slip apart after they are formed into rovings. It is this type of character which the size of the present invention avoids.

The first component of the composition of this invention is a poly(vinyl acetate) latex film former. Poly(vinyl acetate) latexes are known generally as film formers in the glass fiber size art; however, many of the latexes commercially available are not satisfactory for the compositions of this invention. For the purpose of this invention, it is required that the poly(vinyl acetate) latex have a solids content in the range of from about 50 percent to about 60 percent, a particle size in the range of from about 0.25 to about 0.35 micron and a pH in the range of from about 4.5 to about 5.0. A specific material exemplary of a satisfactory poly(vinyl acetate) latex is a poly(vinyl acetate) homopolymer emulsion sold by the Celanese Corporation under the trade designation "CL-122." This material has a solids content of 55 percent, a pH of 4.7, a particle size in the range of 0.25 to 0.35 micron and forms a film having a Sward hardness of 20 to 23. The poly(vinyl acetate) film former will be present in the composition as from 0.5 to 15 weight percent and preferably as 1 to 10 weight percent of the composition, measured on a dry basis.

A second component of the sizing composition of this invention is a polyester compatible silane, preferably a methacrylic silane. The silane serves as a coupling agent to promote greater adhesion between the glass fibers and the resin matrix they are to reinforce. Typical of such materials is a gamma-methacryloxy-propyltrimethoxy silane, commercially available from the Union Carbide Company, under the trade designation "A-174." This material is a low toxicity liquid having a specific gravity of 1.04. The silane component will be present as 0.01 to 0.6 weight percent, preferably 0.1 to 0.4 weight percent of the composition.

The sizing composition of this invention also contains at least one alkyl amide reaction product of a $C_5$ to $C_{20}$ alkyl carboxylic acid and an ethylene amine. The alkyl carboxylic acid reactant may be saturated or unsaturated and may be branched or straight chain. It will preferably be an acid containing a $C_5$ to $C_{15}$ straight chain backbone having 0 to 5 sites of unsaturation and 0 to 2 side chains, with each side chain containing 1 to 2 carbon atoms. Typical examples includes oleic acid, pelargonic acid, lauric acid, capric acid, caproic acid, caprylic acid, 3-methyl-octanonic acid, 1,2-dimethyl-nonanonic acid, and the like, as well as mixtures thereof, such as mixtures of pelargonic and caprylic acids. The reaction products may be such as to be cationic and contain methallyl groups. The methallyl function may be provided by, for instance, an acid such as 2-methyl-non-2-enoic acid, 2-methyl-dec-2-enoic acid, and 2-methyl-dodec-2-enoic acid. The ethylene amine may be any of ethylene diamine, diethylene triamine, triethylene tetramine, tetraethylene pentamine, pentaethylene hexamine or a similar poly(ethylene amine). Preferred are the poly(ethylene amines) having at least three ethylene groups and four amine groups, i.e., triethylene tetramine or higher. It is preferred in this composition that there be at least two such amide reaction products, preferably one of which will be cationic and have methallyl functions. A typical such combination is one prepared from two materials commerically available from ICI America, Inc., under the trademark "Cirrasol." The first Cirrasol material has the trade designation "185-A" and comprises the reaction product of pelargonic and caprylic acids with tetraethylene pentamine to form a partially crystallized viscous liquid amide. This material can subsequently be solubilized with acetic acid for use in the size composition of this invention. The second Cirrasol material is designated "220" and is a liquid reaction product of pelargonic and caprylic acids with tetraethylene pentamine which contains methallyl groups and is cationic. The amide components in this invention will be present as 0.01 to 1.0 weight percent, preferably 0.1 to 0.5 weight percent of the composition. Where a mixture of amide reaction products are present, each will be present as from about 0.01 to 0.05 weight percent, preferably from 0.1 to 0.3 weight percent each of the composition. They may be present in equal amounts, or the cationic methallyl-containing amide may predominate.

The fourth component of this invention is a nonionic surfactant derived from a hydrogenated fatty acid containing oil. Typical of such oils are vegetable oils, such as castor oil, olive oil, peanut oil and rape seed oil and animal oils such as fish oil and lard oil. It is preferred that the non-drying vegetable oils, which have a lower degree of unsaturation, be used. However, it is well known that there is no clear line of demarcation between non-drying, semi-drying and drying oils, since these classifications are merely rough designations based on generally increasing degrees of unsaturation and tendency toward polymerization. Consequently, materials other than non-drying vegetable oils may be used, although the latter are preferred. An exemplary material is a non-ionic surfactant composed of an alkoxy adduct of hydrogenated castor oil, having as its major components linoleic and ricinoleic acids, which is commercially available from the Baker Castor Oil Company, under the trademark "Surfactol" and the designation "365". The surfactant component will be present as 0.05 to 0.5 weight percent of the composition, and preferably as from 0.07 to 0.3 weight percent.

The balance of the composition comprises deionized water. The water component will be present in an amount sufficient to produce a aqueous solution having up to about 20 to 22 percent solids and a minimum solids content of about 1 percent. It is preferred that the solids component of the aqueous size solution be in the range of from about 4 to 7 percent and preferably from about 5.0 to 5.5 percent.

The compositions of this invention will have a final mix pH in the range of from 4 to 6 and preferably of from 4.5 to 5.5. Acetic acid may be added during formulation to adjust the pH to this required range.

As an example of a composition of this invention, and its use as a size applied to glass fiber intended for use in composite reinforced plastic pipe, is the following:

A composition containing 8.9 weight percent of a poly(vinyl acetate) homopolymer emulsion ("Celanese CL-122"), 0.2 weight percent of a cationic methallyl function containing amide ("Cirrasol 220"), 0.1 weight percent of a related amide ("Cirrasol 185-A"), 0.2 weight percent of a polyester compatible silane ("Union Carbide A-174"), 0.2 weight percent of an alkoxy adduct of hydrogenated castor oil ("Baker Surfactol 365"), and 90.4 weight percent of deionized water were combined in the following manner: to one-half of the deionized water in a mixing tank was added the poly(vinyl acetate) emulsion. Thereafter the two amide materials were added while the water was maintained at a temperature of about 150°F. Both the hydrogenated castor oil surfactant and the silane were separately dispersed in cold deionized water and then added to the main mixture, following which the remainder of the deionized water was added and the pH adjusted to about 5.0 with acetic acid. This composition was then applied to an M filament (approximately 16 micron diameter) of E glass having a nominal yardage of 700 yards per pound per roving strand. The roving was thereafter creeled and a multiple number of ends fed through an impregnator to coat the rovings with polyester binder. The resulting material was helically wrapped on a pipe mold or mandrel as part of the production of composite reinforced plastic pipe. On formation of the rovings, the size of this example was found to impart a degree of lubricity sufficient that the fiber glass was readily handled, but not so great that the individual filaments had a tendency to slide apart.

What is claimed is:

1. A glass fiber sizing composition having a degree of lubricity appropriate to formation of roving and compatible with polyester mixes, which consists of: 0.5 to 15.0 weight percent of a poly(vinyl acetate) latex film former having a solids content of about 50-60 percent, a particle size in the range of about 0.25 to 0.35 micron and a pH in the range of 4.5 to 5.0; 0.01 to 0.6 weight percent of a polyester compatible silane; 0.01 to 1.0 weight percent of at least one alkyl amide reaction product of a $C_5$ to $C_{20}$ alkyl carboxylic acid and an ethylene amine; 0.05 to 0.5 weight percent of a nonionic surfactant derived from hydrogenated fatty acid containing oil; and the balance comprising deionized water; said glass fiber size composition having a pH in aqueous solution in the range of from 4 to 6.

2. The composition of claim 1 wherein said poly(vinyl acetate) latex forms a film having a Sward hardness of 20 to 23.

3. The composition of claim 1 wherein said alkyl carboxylic acid contains a $C_5$ to $C_{15}$ straight chain backbone having 0 to 5 sites of unsaturation and 0 to 2 side chains, each of said side chains containing 1 to 2 carbon atoms; and wherein said ethylene amine is a poly(ethylene amine) having at least three ethylene groups and four amine groups.

4. The composition of claim 1 wherein said nonionic surfactant is derived from a hydrogenated fatty acid containing non-drying vegetable oil.

5. The composition of claim 1 wherein said size is in the form of a aqueous solution having from 1 to 22 percent solids.

6. The composition of claim 1 consisting of 1 to 10 weight percent of said poly(vinyl acetate) latex film former, 0.1 to 0.4 weight percent of said polyester compatible silane, 0.1 to 0.5 weight percent of at least one of said alkyl amide reaction products, 0.07 to 0.3 weight percent of said nonionic surfactant, and the balance deionized water, the entire size composition comprising an aqueous solution having from 4 to 7 percent solids.

7. The composition of claim 6 containing a mixture of alkyl amide reaction products of alkyl carboxylic acids and ethylene amines.

8. The composition of claim 7 wherein said alkyl carboxylic acids are pelargonic and caprylic.

9. The composition of claim 8 wherein each of said reaction products is present as from 0.01 to 0.05 weight percent of the size composition.

10. The composition of claim 1 consisting of: 8.9 weight percent of said poly(vinyl acetate) latex film former, said poly(vinyl acetate) latex film former being present as a homopolymer emulsion containing 55 weight percent solids; 0.2 weight percent of a cationic methallyl function containing amide reaction product of a mixture of pelargonic and caprylic acids with tetraethylene pentamine; 0.01 weight percent of an alkyl amide reaction product of a mixture of pelargonic and caprylic acids with tetraethylene pentamine; 0.2 weight percent of gamma-methacryloxy-propyltrimethoxy silane; 0.02 weight percent of alkoxy adduct of hydrogenated castor oil and 90.4 weight percent of deionized water.

* * * * *